(12) United States Patent
Todd

(10) Patent No.: US 11,687,952 B2
(45) Date of Patent: Jun. 27, 2023

(54) LEVERAGING DATA IN DATA MARKETPLACE ENVIRONMENT

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

(21) Appl. No.: 16/260,999

(22) Filed: Jan. 29, 2019

(65) Prior Publication Data
US 2020/0242631 A1    Jul. 30, 2020

(51) Int. Cl.
*G06Q 30/02* (2023.01)
*G06Q 30/0201* (2023.01)
*H04W 4/38* (2018.01)
*G06F 16/907* (2019.01)
*G06Q 20/04* (2012.01)

(52) U.S. Cl.
CPC ....... *G06Q 30/0201* (2013.01); *G06F 16/907* (2019.01); *G06Q 20/047* (2020.05); *H04W 4/38* (2018.02)

(58) Field of Classification Search
CPC .. G06Q 30/0201; G06Q 20/047; G06Q 20/12; H04W 4/38; G06F 16/907
See application file for complete search history.

(56) References Cited

U.S. PATENT DOCUMENTS

| | | | |
|---|---|---|---|
| 2009/0018996 A1* | 1/2009 | Hunt | G06F 16/2264 |
| 2012/0011031 A1* | 1/2012 | Lewis | G06Q 30/0641 |
| | | | 705/27.1 |
| 2012/0101912 A1* | 4/2012 | Sen | G06Q 30/08 |
| | | | 705/26.3 |
| 2012/0116911 A1* | 5/2012 | Irving | G06Q 30/0611 |
| | | | 705/26.4 |

(Continued)

OTHER PUBLICATIONS

Krishnamachari et al. "I3:IoT Marketplace for Smart Communities" Proceedings of the 16th Annual International Conference on Mobile Systems, Applications, and Services. 2018. https://dl.acm.org/doi/pdf/10.1145/3210240.3223573. (Year: 2018).*

(Continued)

*Primary Examiner* — Robert D Rines
*Assistant Examiner* — Alissa D Karmis
(74) *Attorney, Agent, or Firm* — Ryan, Mason & Lewis, LLP

(57) ABSTRACT

Techniques for leveraging data in a data marketplace environment are provided. For example, a method comprises the following steps. A representation of one or more data valuations for a given data set is obtained. The representation of the one or more data valuations for the given data set is converted into a value for presentation to a data marketplace environment. The data marketplace environment comprises one or more data marketplace protocols that each enable one or more data consumers to obtain data. The method brokers a transfer of the given data set through at least one of the data marketplace protocols to at least one data consumer. The method manages transfer of the given data set to the at least one data consumer and receipt of a result of the transfer from the at least one data consumer.

20 Claims, 9 Drawing Sheets

(56) References Cited

U.S. PATENT DOCUMENTS

| | | | |
|---|---|---|---|
| 2016/0162882 A1* | 6/2016 | McClung, III | G06Q 20/3278 |
| | | | 705/41 |
| 2017/0013047 A1* | 1/2017 | Hubbard | G06F 16/9537 |
| 2020/0005264 A1* | 1/2020 | Patterson | G06Q 50/06 |
| 2020/0005403 A1* | 1/2020 | Patterson | G07F 13/00 |

OTHER PUBLICATIONS

Telegraph.Co.UK, "The 10 Most Popular Cryptocurrencies in 2018," https://www.telegraph.co.uk/technology/digital-money/top-10-popular-cryptocurrencies-2018/, May 25, 2018, 3 pages.

datafloq.com, "Public Data Marketplaces and Initiatives," https://datafloq.com/public-data/, 2019, 5 pages.

Satoshi Nakamoto, "Bitcoin: A Peer-to-Peer Electronic Cash System," http://bitcoin.org/bitcoin.pdf, 2008, 9 pages.

Juan Benet, "IPFS-Content Addressed, Versioned, P2P File System," arxiv.org/abs/1407.3561, 2014.

U.S. Appl. No. 16/206,438 filed in the name of Stephen J. Todd filed Nov. 30, 2018 and entitled "Secure Data Pools."

U.S. Appl. No. 16/163,717 filed in the name of Stephen J. Todd filed Oct. 18, 2018 and entitled "Data Valuation and Sensor Data Management."

* cited by examiner

100

200

| COST VALUE | VALUE 1 | VALUE 2 | VALUE 3 | VALUE 4 | VALUE 5 | VALUE 6 | VALUE 7 |
|---|---|---|---|---|---|---|---|
| $100K | 22.6 | 30.6 | 88.3 | 26.9 | 44.3 | 34.5 | 88.2 |

300

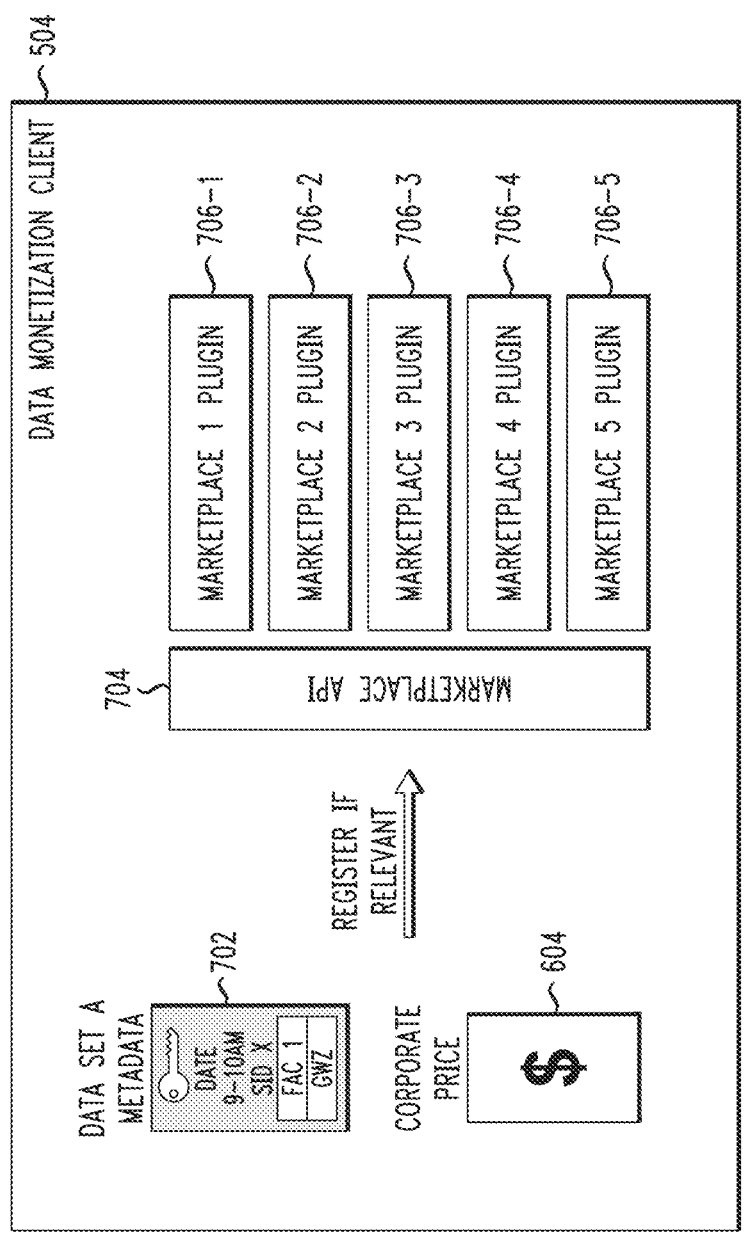
FIG. 7
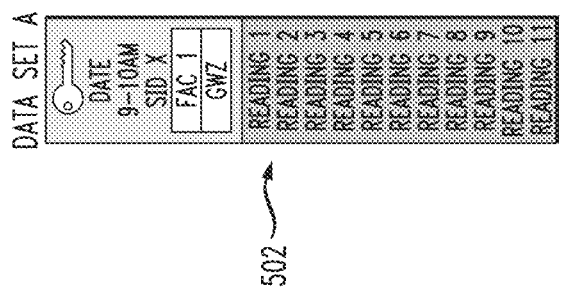

900

1000

LEVERAGING DATA IN DATA MARKETPLACE ENVIRONMENT

FIELD

The field relates generally to information processing systems and, more particularly, to techniques for leveraging data in a data marketplace environment.

BACKGROUND

Information technology (IT) is typically understood to refer to systems and processes, including hardware and software, that an enterprise uses to electronically process and store its data. On the other hand, operational technology (OT) typically refers to systems and processes that detect or cause a change through the monitoring and/or control of physical devices, processes and events in the enterprise. Thus, as compared to the term IT, the term OT is used more in an industrial sense and typically refers to direct monitoring and control or actuation of physical devices. Such devices may, for example, monitor and transmit data (e.g., sensors, meters, etc.), and respond by actuating controlling devices (e.g., actuators such as gates, motors, etc.) to perform functions involved in an industrial activity. Still further, such sensors and actuators are typically connected to the IT of the enterprise via one or more gateways. A gateway, therefore, is a computing node that enables data communications between at least two discrete networks, in this case, between an IT network and an OT network. It is realized that OT data can be valuable. However, leveraging such data presents many challenges.

SUMMARY

Embodiments of the invention provide techniques for leveraging data in a data marketplace environment.

For example, in one embodiment, a method comprises the following steps. A representation of one or more data valuations for a given data set is obtained. The representation of the one or more data valuations for the given data set is converted into a value for presentation to a data marketplace environment. The data marketplace environment comprises one or more data marketplace protocols that each enable one or more data consumers to obtain data. The method brokers a transfer of the given data set through at least one of the data marketplace protocols to at least one data consumer. The method manages transfer of the given data set to the at least one data consumer and receipt of a result of the transfer from the at least one data consumer.

These and other features and advantages of the invention will become more readily apparent from the accompanying drawings and the following detailed description.

BRIEF DESCRIPTION OF THE DRAWINGS

FIG. 7 illustrates an extensible data marketplace interface according to an illustrative embodiment.

DETAILED DESCRIPTION

Figure 1:
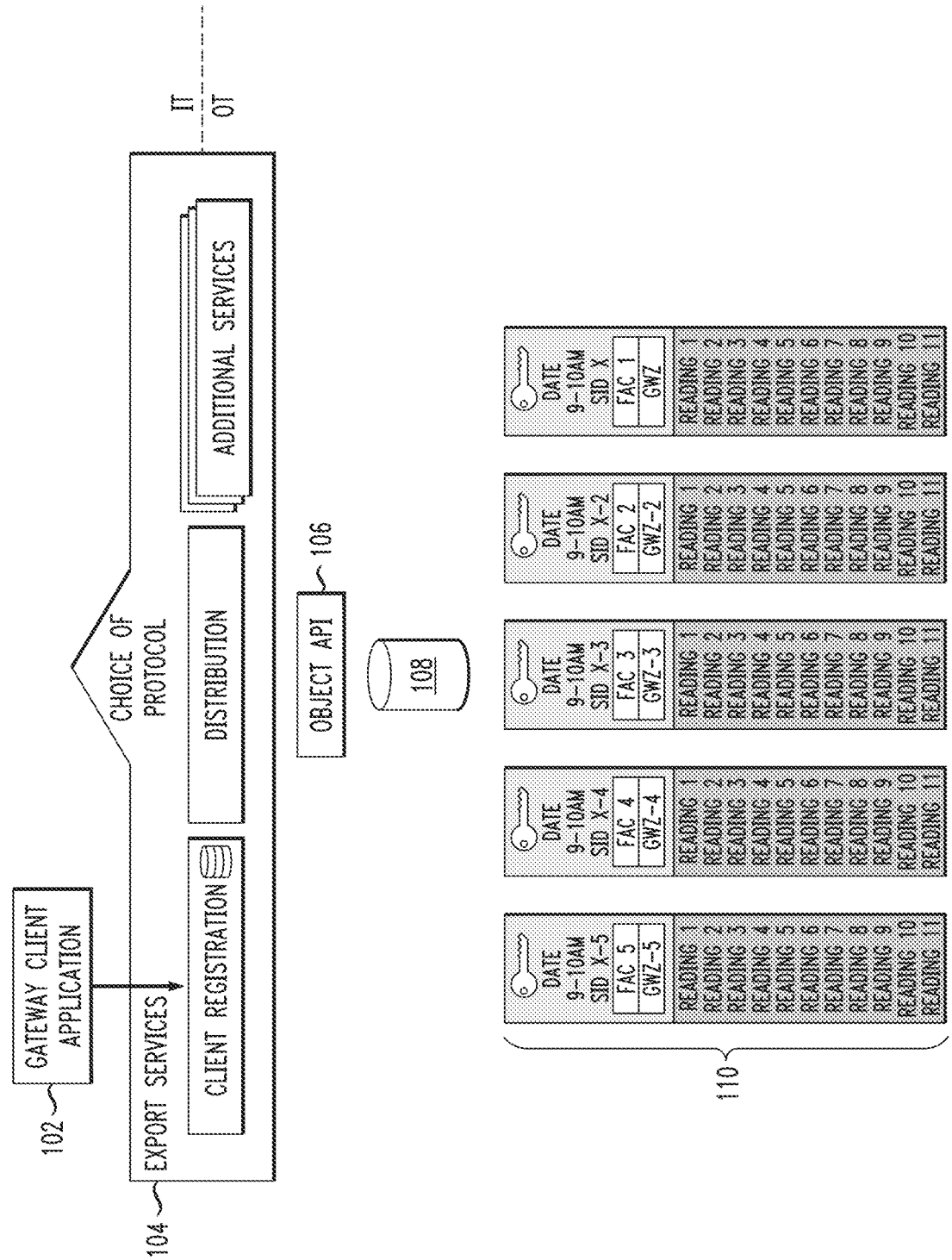
FIG. 1 illustrates a framework that manages operational technology data for secure access by an information technology client according to an illustrative embodiment.

Illustrative embodiments may be described herein with reference to exemplary cloud infrastructure, data repositories, data centers, data processing systems, computing systems, information processing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "information processing system," "data lake," and the like as used herein are intended to be broadly construed so as to encompass, for example, cloud computing or storage systems, as well as other types of systems comprising distributed virtual infrastructure.

For example, some embodiments comprise a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of IT infrastructure. However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device or an application program of a computing system or some other form of computing platform;

"data" as utilized herein is intended to be broadly construed so as to encompass, for example, electronic or digital data;

"metadata" as utilized herein is intended to be broadly construed so as to encompass, for example, data that describes other data, i.e., data about other data; and "leveraging" or "leverage" as utilized herein is intended to be broadly construed so as to encompass, for example, utilization of data to obtain one or more benefits. For example, data of an enterprise can be monetized in a data marketplace environment whereby an enterprise obtains cryptocurrency in return for its data. However, an enterprise can leverage its data to receive in return one or more benefits other than cryptocurrency, e.g., allocation and use of computing resources that benefit the operational performance of an enterprise's IT and/or OT infrastructure (e.g., compute, storage and/or network capacities). Data can also be leveraged in exchange for other data. In some cases, data can be leveraged by donating the data and receiving a taxation benefit or simply good will.

As mentioned above, leveraging OT data, such as gateway data (e.g., data collected by a gateway from sensors coupled to the gateway), presents many challenges.

Methods have been proposed to prepare gateway data for potential leveraging. U.S. Ser. No. 16/206,438, filed on Nov. 30, 2018 and entitled "Secure Data Pools," the disclosure of which is incorporated by reference herein in its entirety, discloses a secure data pool methodology and system in which data is ingested, labeled, and stored into a secure, scalable object pool.

In certain implementations of the above-referenced patent application, the gateway utilizes EdgeX Foundry™ (The Linux Foundation®) software which provides an open source microservices framework (i.e., core services, supporting services, and export services including client registration and data distribution) that allows a connection and execution environment for edge devices, e.g., sensors and/or actuators operatively coupled to a gateway. The object pool system in certain implementations is realized using: (i) Dell EMC Elastic cloud storage (ECS); an Inter Planetary File System (IPFS) which is an open-source, content-addressable system that has torrent-like features (but lacks the enterprise hardening of ECS); or a combination thereof. The IPFS system is further described in J. Benet, "IPFS—Content Addressed, Versioned, P2P File System," 2014, the disclosure of which is incorporated by reference herein in its entirety.

Furthermore, the object pool system in certain implementations uses data ownership "keys" and blockchain-based data registration techniques to permanently tie generated OT data to a given entity (e.g., the department in an enterprise that is responsible for OT data stewardship). The blockchain technology may be any variety of distributed ledger. In the case of a "bitcoin" type implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety. However, distributed ledgers such as, but not limited to, R3 Corda, Ethereum, and Hyperledger may be employed in alternative embodiments.

FIG. 1 illustrates a framework 100 that manages OT data for secure access by a gateway client application 102. The gateway client application 102 connects into a client registration microservice, e.g., part of EdgeX Foundry™ export services 104. Furthermore, the export services 104 connect, through an object application programming interface (API) 106, to a secure object pool 108 which, in this example, stores five data sets 110 that are respectively populated with sensor readings (bottom portions of data set visualizations in FIG. 1) and corresponding metadata (top portions of data set visualizations in FIG. 1) that describe the readings, where they came from, when they were captured, who owns them (represented by the key symbol), etc.

More particularly, as shown, gateway client application 102 utilizes export services 104 to access sensor data 110. However, rather than accessing the sensor data 110 directly from the sensors in the OT environment, the EdgeX Foundry™ framework is adapted to obtain the requested data via object API 106 from part of a secure object pool 108, which stores sensor data 110.

It is realized herein that a valuable service that a gateway client application can provide is a data leveraging service. For example, in one or more embodiments, assume that gateway client application 102 is configured to provide a data monetization service to data owners represented by the keys in the five data sets 110 depicted in FIG. 1.

Figures 2, 3:
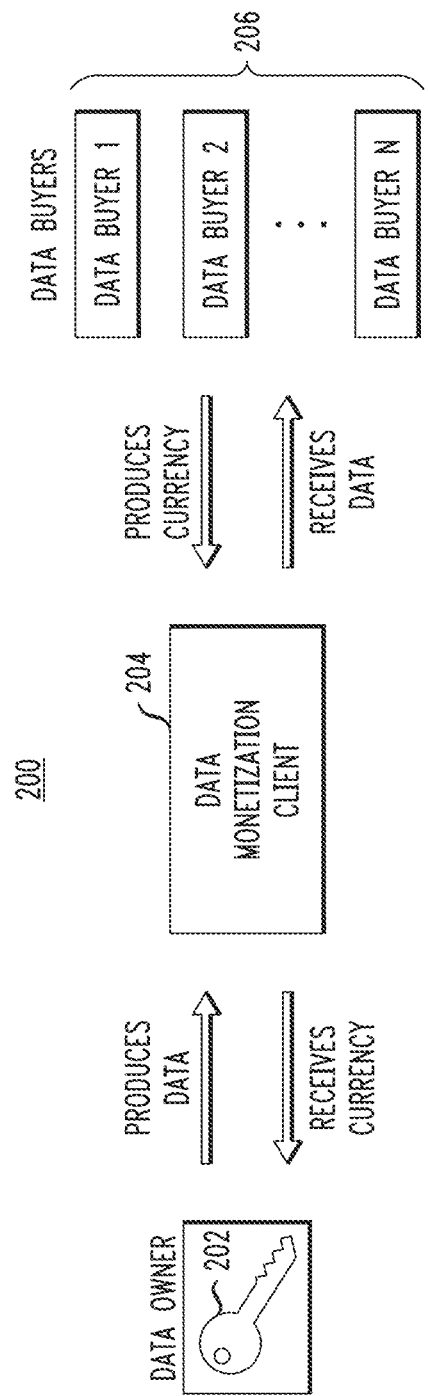
FIG. 2 illustrates a process for leveraging operational technology data in a data marketplace environment according to an illustrative embodiment.
FIG. 3 illustrates a data structure for representing multiple valuations of a given data set according to an illustrative embodiment.

FIG. 2 illustrates a process 200 of gateway client application 102 leveraging OT data (data sets 110) in a data marketplace environment. More particularly, FIG. 2 depicts a data owner 202 producing data for a data monetization client 204. Data monetization client 204 is a gateway client application program (102 in FIG. 1) that serves as a data/currency broker between the data owner 202 (data producer) and a set 206 of data buyers 1, 2, . . . , N (data consumers). As brokered by data monetization client 204, data owner 202 produces data and, in return, one or more of the data buyers 206 produce currency. Data owner 202 receives the currency from data monetization client 204, and the one or more data buyers 206 receive the data from data monetization client 204. As such, data monetization client 204 enables data owner 202 to leverage its data in a data marketplace environment.

The usefulness of such a data monetization client is currently not possible due to several constraining problems, which are described below.

Disparity in valuation algorithms. There are a number of different techniques for calculating value, including priority-based ranking (e.g., which data is the most valuable compared to others), or economic value (e.g., how much money has been generated by a given data set). In fact, for a given data set, a plurality of valuation algorithms can be executed. Data structure 300 in FIG. 3 illustrates eight different values computed from eight different data valuation algorithms for a single data set (i.e., Cost Value, Value 1 through Value 7). Thus, by way of example only, one of the data value calculations for the given data set is a dollar amount (e.g., original dollar amount paid for the data set, current predicted dollar amount for the data set, etc.) while the others are numeric indicators generated by some valuation model or valuation metric (e.g., business value indicator, cost value indicator, market value indicator, unstructured tokenized value indicator, streaming data value indicator, etc.). Data structure 300 can have more or less valuation dimensions, as well as other types of dimensions, than what is illustrated in FIG. 3.

Lack of algorithms for conversion of value to currency. Given the large number of data value permutations depicted in FIG. 3, there is currently no algorithm for converting these values into a currency amount to advertise the data for sale in a data marketplace environment.

Variety of cryptocurrency options. Every data consumer (data buyer 1, 2, ..., N) in FIG. 2 may prefer a different type of cryptographic token through which they conduct their business transactions. Many popular cryptocurrency protocols exist including, but not limited to, Bitcoin, Bitcoin Cash, Litecoin, Dogecoin, Ethereum, BAT, NEO, Ripple XRP, Stellar XRM, Cardano ADA. In a given data marketplace environment, data consumers may use these or other forms of cryptocurrency. It is to be appreciated that the term "data marketplace environment" refers to one or more computing platforms on which data producers sell their data to data consumers.

Variety of data marketplaces. There is an ever-growing number of public data marketplaces in which data consumers and producers can interact including, but not limited to, DEX, DataMarket, Datastreamx, OpenData, Freebase, Enigma, Quandl, Open Science Data Cloud, etc. One or more such public data marketplaces, and/or private data marketplaces, may constitute a data marketplace environment.

Protocol disparity of data marketplaces. The protocols for connecting to and interacting with data marketplaces can vary from service to service. This makes it difficult for a data monetization client to register and share content owned by data producers.

Data donations. Some data producers may wish to donate their data to an open data marketplace (e.g. the Open Science Data Cloud). There is currently no mechanism for receiving a receipt for said donation. These receipts can represent tax advantages to data producers.

Balance sheet auditing. Whenever a client data monetization application sells data (or donates data) on behalf of a data producer, there is currently no way to permanently track those transactions for eventual audit and/or record keeping for balance sheet publication.

Disparity in Cryptocurrency Protocols. If a data consumer wishes to pay in Bitcoin, they use the Bitcoin protocol. If they wish to pay in ethers, they use Ethereum. If they wish to pay in mIOTAs, they use the IOTA protocol. Some of these protocols (Bitcoin, Ethereum) are implemented as blockchains, some of them (IOTA) are represented as DAGs, and others (Corda) are represented as files. This disparity among cryptocurrency protocols represents challenges for a data monetization client.

Many-to-one wallets. A data producer may wish to have one wallet whereby they can track cryptocurrency payments. As illustratively used herein, the term "wallet" refers to an electronic storage unit with a specific address that stores or otherwise manages (e.g., receives and sends) cryptocurrency for the wallet owner. The wallet address may or may not be visible and/or usable by the various cryptocurrency protocols.

Figure 4:
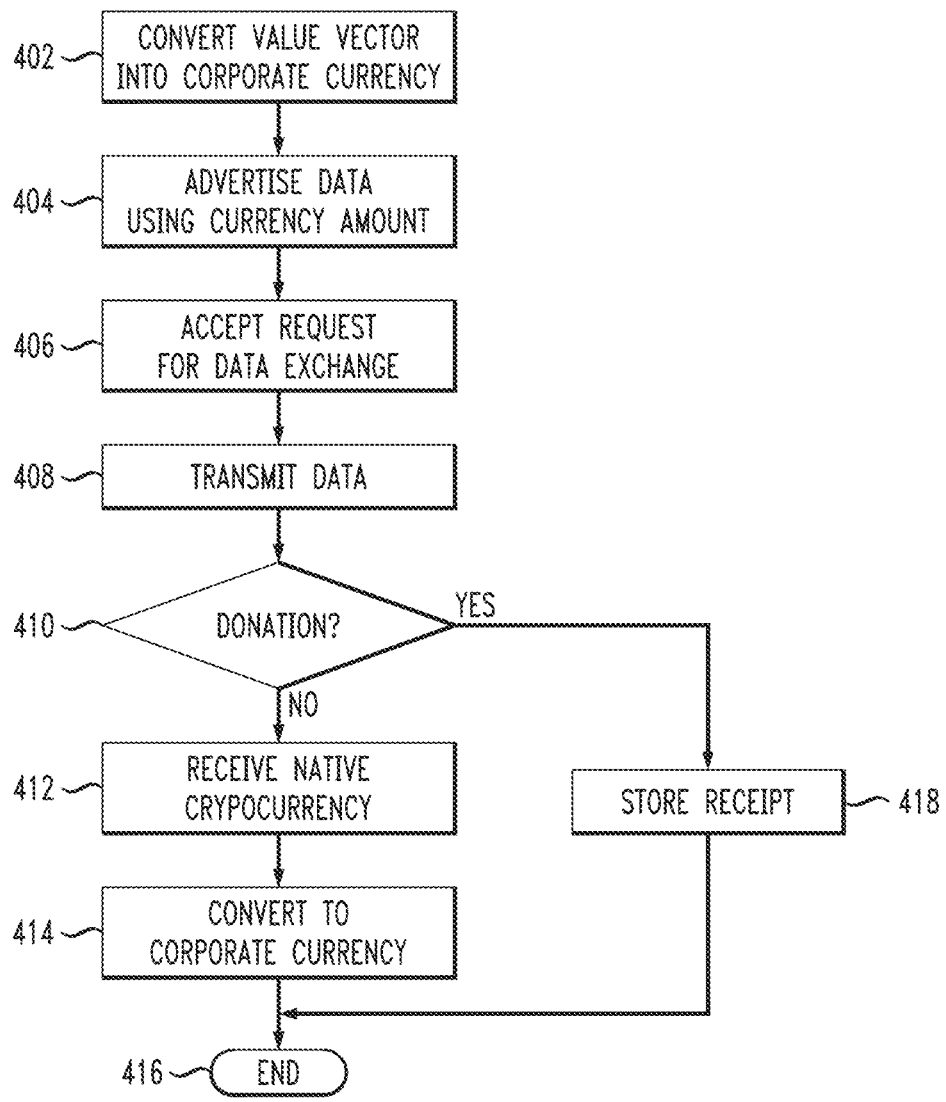
FIG. 4 illustrates a data leveraging algorithm according to an illustrative embodiment.

Illustrative embodiments overcome the above and other challenges by providing techniques for effectively and efficiently leveraging data in a data marketplace environment. FIG. 4 illustrates an algorithm 400 for a data monetization client according to an illustrative embodiment. By way of example only, algorithm 400 can be executed in data monetization client 204 in order to overcome the above and other challenges. The steps in algorithm 400 will first be generally described, and then described in further detail in the context of the figures that follow. As shown in algorithm 400, in step 402, a data monetization client converts a value vector into corporate currency. A value vector is a data structure with one or more dimensions that represent results of the execution of one or more data valuation algorithms on a given data set. By way of example only, data structure 300 in FIG. 3 is considered a value vector in one or more embodiments. In one or more embodiments, corporate currency is a statement of market value (price) for the given data set represented in some denomination corresponding to an enterprise (presumably the owner of the given data set).

In step 404, the data monetization client advertises the given data set using the corporate price computed in step 402. Advertisement is done in the data marketplace environment as will be further explained below.

In step 406, following negotiation through the data marketplace environment between a data consumer (buyer) and the data producer (owner), the data monetization client accepts a request for the data exchange.

In step 408, the data monetization client transmits the given data set to the data consumer.

In step 410, the data monetization client checks whether or not the given data set was intended to be donated.

If a donation is not intended, in step 412, the client monetization client receives (in an electronic wallet designated for the data producer) the agreed upon amount of native cryptocurrency, i.e., the cryptocurrency of the cryptocurrency protocol used by the data consumer (e.g., 10 bitcoins).

In step 414, the data monetization client converts the cryptocurrency into corporate currency (e.g., dollars) and the algorithm ends at block 416.

If a donation is intended (as per step 410), in step 418, the client monetization client receives a receipt from the data consumer and the algorithm ends at block 416.

Figure 5:
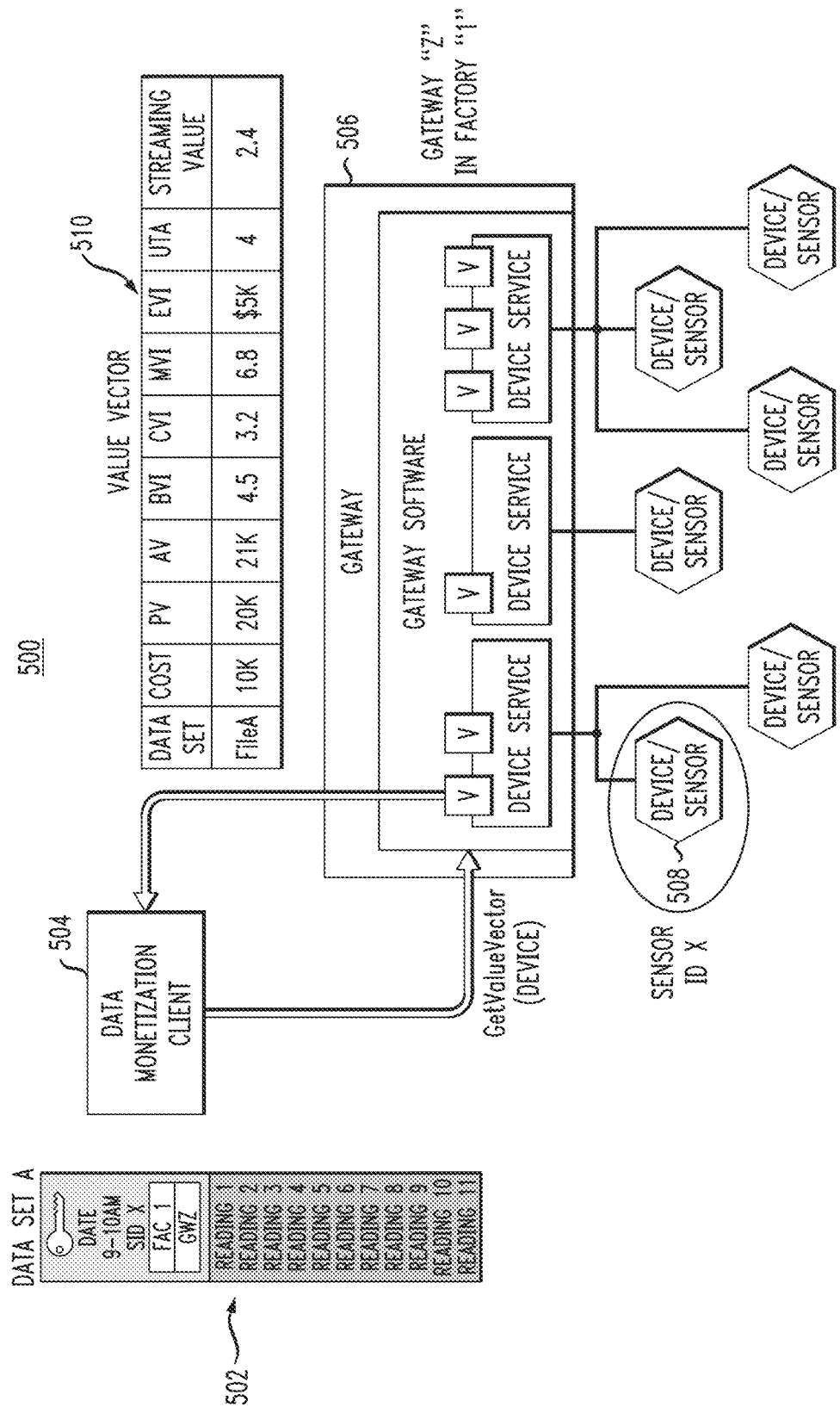
FIG. 5 illustrates a process for retrieving a value vector from a given gateway according to an illustrative embodiment.

FIG. 5 illustrates a process 500 for retrieving a value vector for a given gateway according to an illustrative embodiment. As shown, in order for a data monetization client 504 to create a corporate price for a given data set 502 (e.g., Data Set A), data monetization client 504 first fetches any value statements that have been recorded about the given data set 502 from the gateway 506 that generated the given data set 502 (e.g., Gateway "Z" in Factory "1"). Assume that data monetization client 504 wishes to advertise for sale the given data set which is generated by gateway 506 from sensor readings received from sensor 508 (Sensor ID X). To do so, data monetization client 504 calls an API (GetValueVector(Device)) to retrieve value vector 510 from the gateway 506. Value vector 510 is a statement of the value of the given data set 502. In some embodiments, this value vector is previously calculated using techniques described in U.S. Ser. No. 16/163,717, filed on Oct. 18, 2018 and entitled "Data Valuation and Sensor Data Management," the disclosure of which is incorporated by reference herein in its entirety. Note that the data structure 300 in FIG. 3 is one example of value vector 510.

Figure 6:
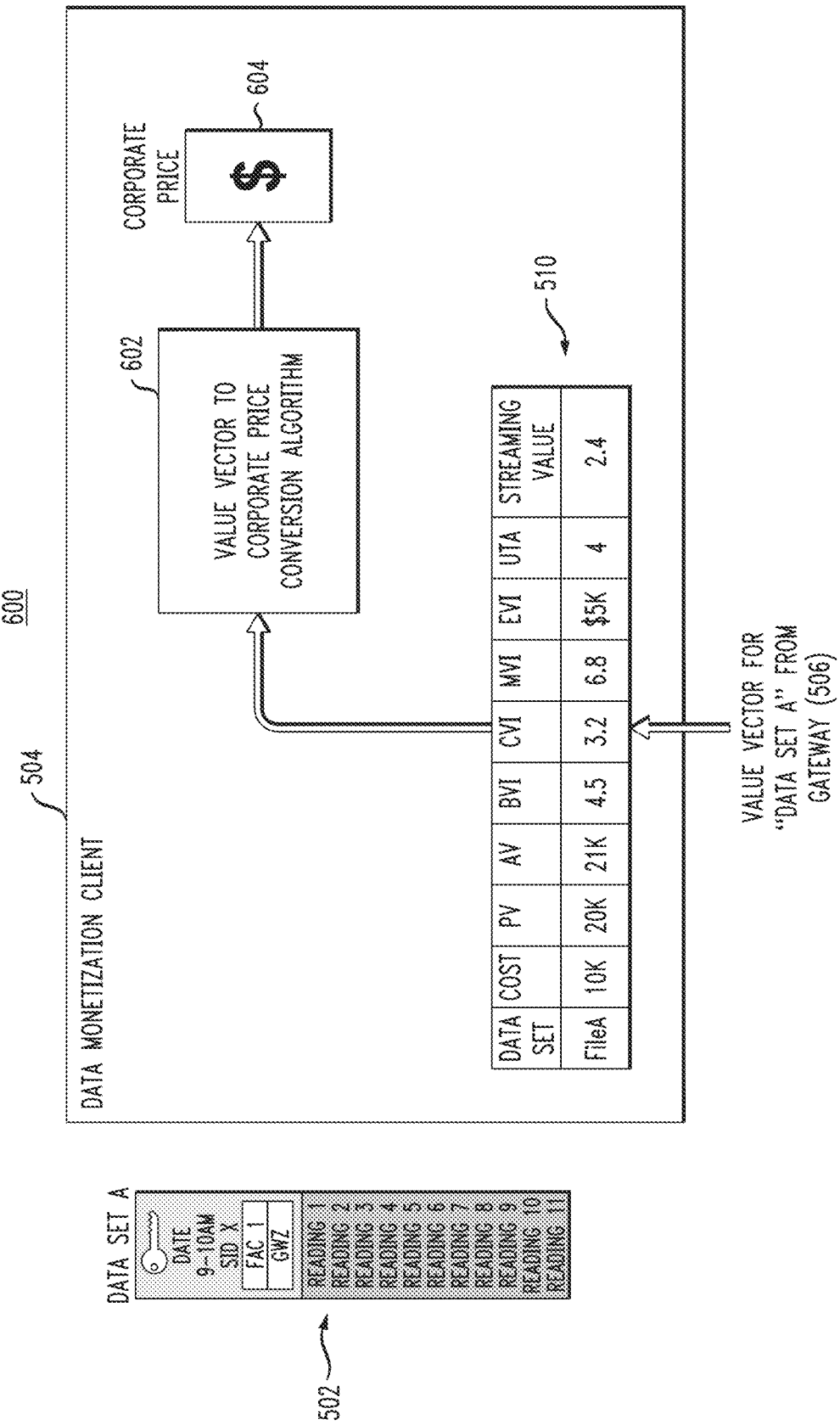
FIG. 6 illustrates a process for converting a value vector to an enterprise value according to an illustrative embodiment.

FIG. 6 illustrates a process 600 for converting a value vector to an enterprise value according to an illustrative embodiment. Recall from FIG. 5, data monetization client 504 obtains value vector 510 associated with data set 502. Now, in process 600 of FIG. 6, data monetization client 504 converts the value vector 510 into an enterprise value. More particularly, as shown, algorithm 602 converts the value vector to a corporate price 604. In illustrative embodiments, corporate price 604 is a statement of market value. For example, this corporate price can be a currency (e.g., euros, dollars, rubles, etc.) that is used to describe quarterly earnings of the enterprise. The corporate price 604 is calculated via algorithm 602 that transforms any available data valuation scores/costs/prices from the value vector 510 into a currency amount.

Embodiments of the conversion algorithm 602 work in various ways. For example, in some embodiments, values from the value vector 510 are plugged into well-established financial equations that the enterprise uses to compute corporate earnings. In other embodiments, look-up tables are consulted that map values (value vector values) to previous prices computed by the enterprise. Still further, certain embodiments weight certain values from the value vector more heavily than other values during the conversion.

Once a corporate price has been established, the data set is registered with multiple data marketplaces. In illustrative embodiments, registration is accomplished through a set of marketplace plugins modules within the data monetization client that abstract the details of the registration process. FIG. 7 illustrates an extensible data marketplace interface 700 according to an illustrative embodiment. More particularly, as shown, data monetization client 504 includes a marketplace application programming interface (API) that abstracts the details of the set of marketplace protocols to which the data set 502 is offered. The marketplace protocols are respectively represented by marketplace plugin modules 706-1 through 706-5 in FIG. 7. Each marketplace plugin module provides the specific commands for interacting with the corresponding marketplace protocol.

For example, data monetization client 504 calls marketplace API 704 for each registered plugin module (706-1 through 706-5), and first determines whether or not the data set 502 has relevance for that marketplace. In some embodiments, relevance is determined by passing at least a portion of the metadata (denoted as 702) from data set 502 to the marketplace API 704. Recall that such metadata describes, for example, what type of readings (e.g., a thermostat) are contained within the data set, and when and where they were captured.

Assuming a given one of the marketplace plugin modules determines that its corresponding marketplace is interested in the data set 502, data monetization client 504 then registers the data set 502 by passing: (a) the corporate price 604 for the data; (b) the type of data being sold; and (c) information about the owner (e.g., wallet, identity, public key, etc.). Note that (b) and (c) are part of the metadata 702 in data set 502. The corporate price 604 is converted into the currency that is used within the given marketplace.

Figure 8:
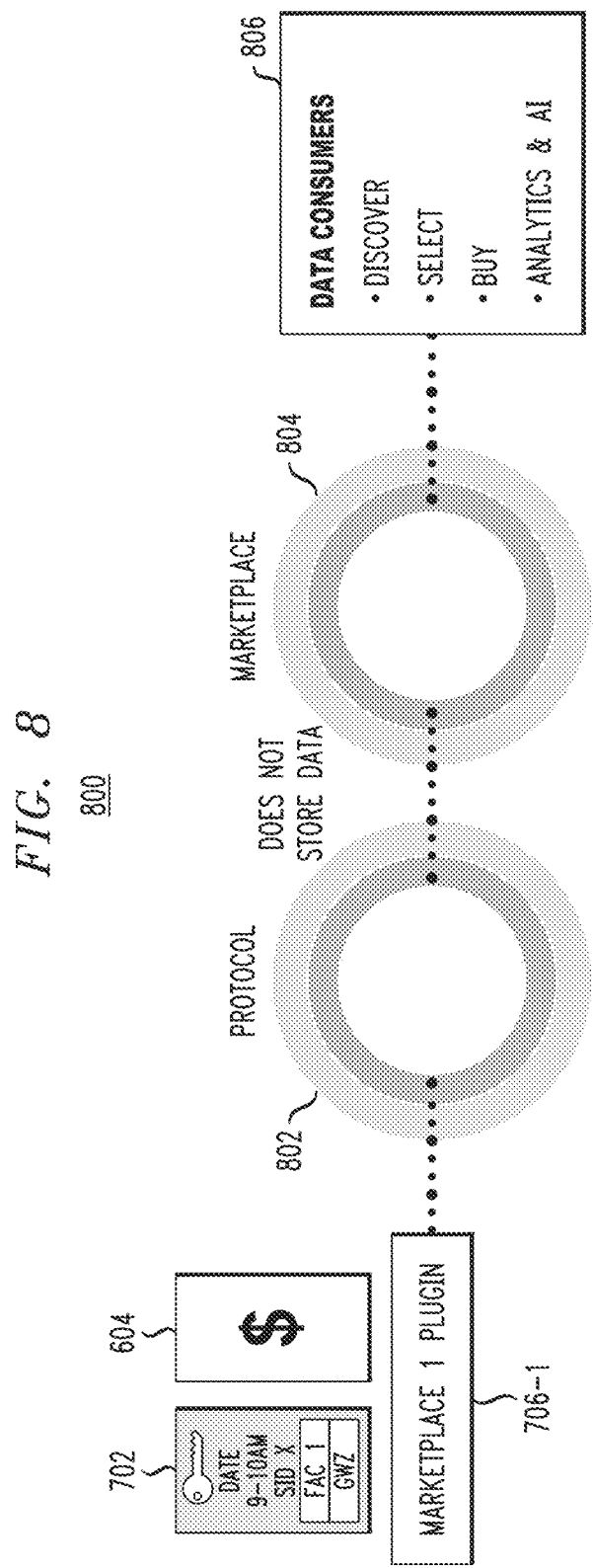
FIG. 8 illustrates registering data in a data marketplace environment according to an illustrative embodiment.

FIG. 8 depicts a process 800 of a specific plugin module 706-1 calling its marketplace protocol 802 to register the data set 502 (via its metadata 702 and corporate price 604) with the corresponding marketplace 804 to enable data consumers 806 to purchase the data set 502. In one example, protocol 802 is the Ocean protocol and marketplace 804 is the DEX data marketplace. The Ocean Protocol (available from Ocean Protocol Foundation Ltd., Singapore) is a decentralized data exchange protocol that can match data producers (e.g., a gateway or gateway data provider) to data consumers (e.g., corporate artificial intelligence (AI) algorithms willing to pay for certain types of data).

In some embodiments, within process 800, data monetization client 504 is configured to register for callbacks for every data set that is registered to a particular plugin module. Should a data consumer wish to purchase a data set, the corresponding plugin module asynchronously notifies the data monetization client 504, which then has the option to agree to the request and initiate the data transfer transaction. In certain embodiments, data monetization client 504 is configured to use a polling mechanism as part of API 704 to check if data consumers have registered interest in a given data set.

Figure 9:
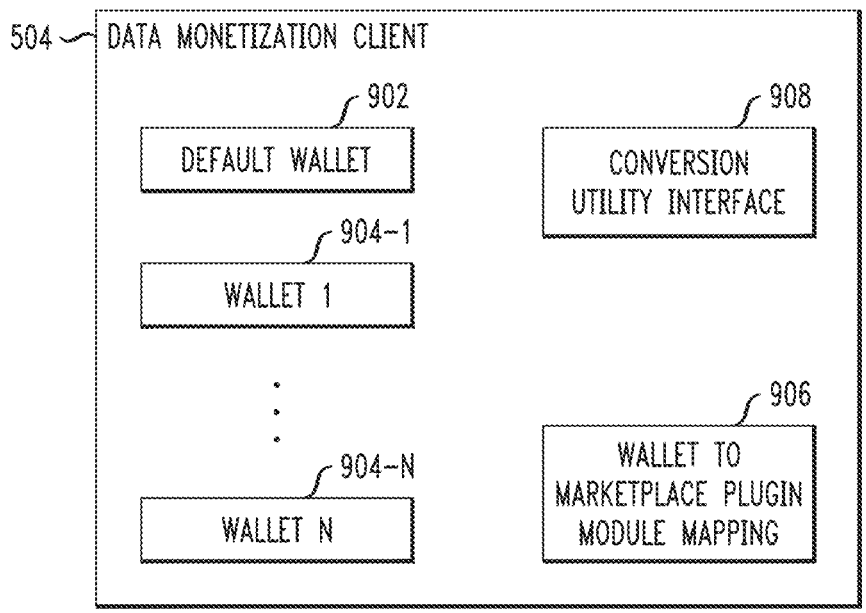
FIG. 9 illustrates wallet configurations according to illustrative embodiments.

Still further, in one or more embodiments, data monetization client 504 is configured with a wallet configuration to manage cryptocurrency payments. FIG. 9 illustrates a wallet configuration 900 according to an illustrative embodiment. As shown, data monetization client 504 is configured with a default wallet 902 through which it receives payments. The default wallet 902 can serve as a single wallet for any and all cryptocurrency transactions.

Additionally or alternatively, for each data marketplace, data monetization client 504 is configured to create a specific wallet for the currency that is favored by each marketplace, and that wallet address is given to the corresponding marketplace plugin module (e.g., 706-1 through 706-5 in FIG. 7). As shown in FIG. 9, wallets 904-1, . . . , 904-N represent wallets for each plugin module. In such embodiments, data monetization client 504 also creates and maintains a mapping (e.g., table) 906 of wallets to plugin modules.

Additionally or alternatively, data monetization client 504 is configured to use one or more conversion utilities (e.g., Ripple), through interface 908, that automatically convert the cryptocurrencies from one protocol into the wallet currency format of the data monetization client 504.

Data monetization client 504 can release the data set to a data consumer through any number of mechanisms. In various embodiments, these mechanisms include the calling of smart contracts, the use of file transfer protocols, etc. As a result of completing a data transfer to a data consumer, one of two results flow back to the data monetization client 504 (and thus to the data owner): (1) cryptocurrency that serves as payment for the data; or (2) a receipt for the donation of the data. Note that in embodiments where a data set is leveraged by a data producer for purposes other than monetization/donation, the results that are received by the client include items other than cryptocurrency or donation receipts. By way of example only, the data producer can receive one or more other data sets, access to one or more computing resources, and/or other results, in exchange for a given data set.

Figure 10:
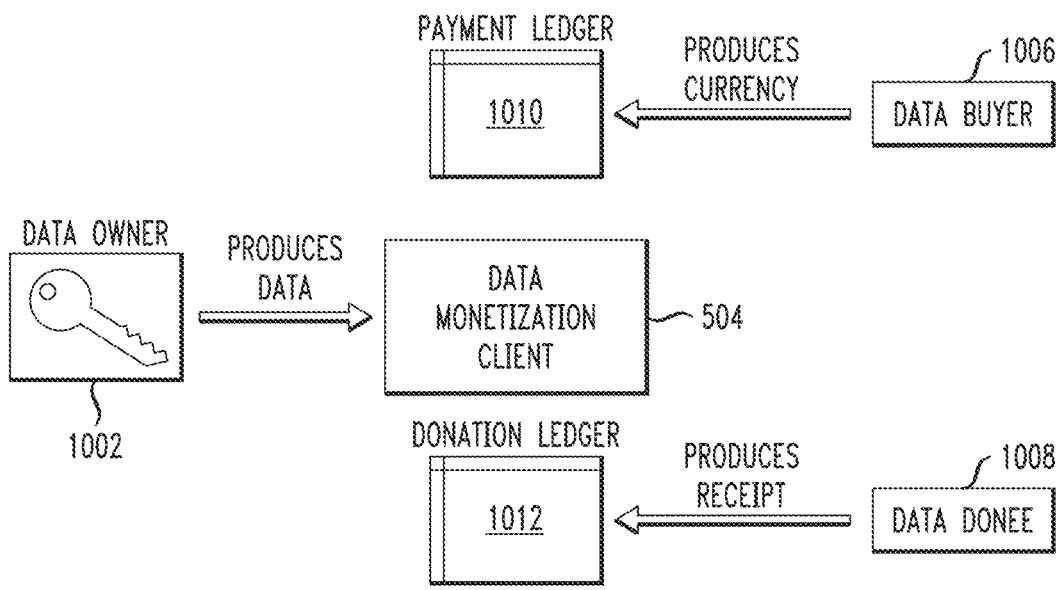
FIG. 10 illustrates ledger systems to manage data leveraging transactions according to an illustrative embodiment.

FIG. 10 illustrates a process 1000 for these two scenarios. As shown, assume that data owner 1002 produces a data set that is brokered through data monetization client 504 and purchased by data buyer 1006 and/or accepted as a donation by data donee 1008. Data monetization client 504 maintains or is otherwise in communication with a payment ledger 1010 and a donation ledger 1012. In various embodiments, ledgers 1010 and 1012 can be part of a blockchain distributed ledger system or each ledger can be part of a separate blockchain distributed ledger system. In some embodiments, payment ledger 1010 immutably records the movement of cryptocurrency from the data buyer's wallet to the data owner's wallet, while donation ledger 1012 immutably records a pointer to a receipt generated by a data donation entity (donee).

Figure 11:
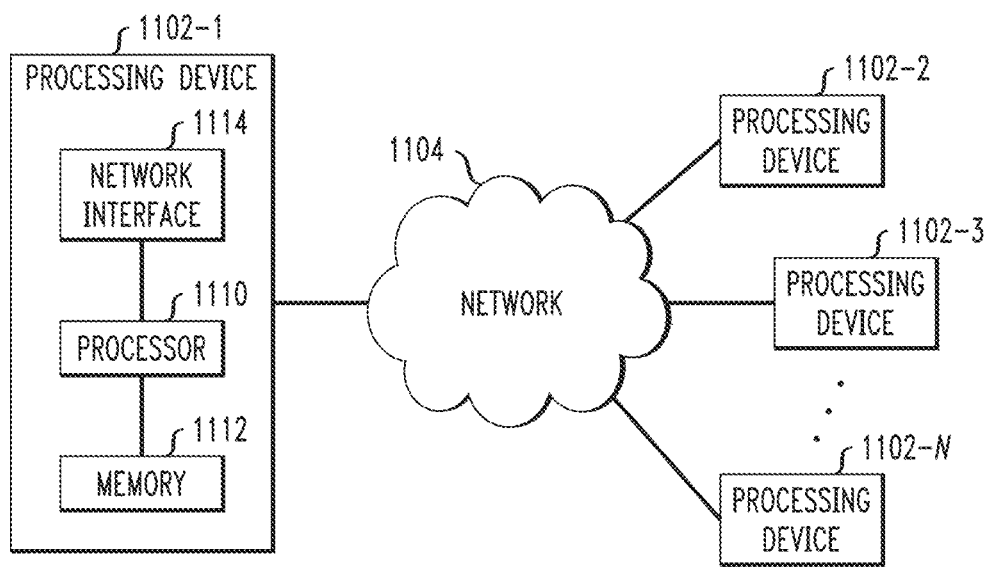
FIG. 11 illustrates a processing platform used to implement a data leveraging system according to an illustrative embodiment of the invention.

An example of a processing platform on which a secure data pool framework environment (as shown in FIGS. 1-10) according to illustrative embodiments can be implemented is processing platform 1100 shown in FIG. 11. The processing platform 1100 in this embodiment comprises a plurality of processing devices, denoted 1102-1, 1102-2, 1102-3, . . . 1102-N, which communicate with one another over a network 1104. It is to be appreciated that methodologies described herein may be executed in one such processing device 1102, or executed in a distributed manner across two or more such processing devices 1102. Thus, the framework environment may be executed in a distributed manner across two or more such processing devices 1102. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 11, such a device comprises at least one processor and an associated memory, and implements one or more functional modules for instantiating and/or controlling features of systems and methodologies described herein. Multiple elements or modules may be implemented by a single processing device in a given embodiment.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random access memory (RAM), read-only memory (ROM) or other types of memory, in any combination. The one or more software programs when executed by a processing device, such as the processing device 1102-1, causes the device to perform functions associated with one or more of the components/steps of system/methodologies in FIGS. 1-10. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the device with the network 1104 and other system components. Such circuitry may comprise conventional transceivers of a type well known in the art.

The other processing devices 1102 (1102-2, 1102-3, . . . 1102-N) of the processing platform 1100 are assumed to be configured in a manner similar to that shown for processing device 1102-1 in the figure.

The processing platform 1100 shown in FIG. 11 may comprise additional known components such as batch processing systems, parallel processing systems, physical machines, virtual machines, virtual switches, storage volumes, etc. Again, the particular processing platform shown in this figure is presented by way of example only, and systems described herein may include additional or alternative processing platforms, as well as numerous distinct processing platforms in any combination.

Also, numerous other arrangements of servers, clients, computers, storage devices or other components are possible in processing platform 1100. Such components can communicate with other elements of the processing platform 1100 over any type of network, such as a wide area network (WAN), a local area network (LAN), a satellite network, a telephone or cable network, or various portions or combinations of these and other types of networks.

Furthermore, it is to be appreciated that the processing platform 1100 of FIG. 11 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be noted that portions of the data monetization client and marketplace environment described herein may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. Note that, in various illustrative embodiments, a data monetization client as described herein can be implemented as part of the IT infrastructure and/or OT infrastructure of a given enterprise (or other data producer/data owner).

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining a representation of a plurality of data valuations for a given data set, the representation of the data valuations for the given data set comprising a value data structure including a plurality of dimensions, wherein each dimension of the value data structure corresponds to a data valuation computed by a given data valuation algorithm, wherein the given data set comprises operational technology data collected by at least one gateway device from a plurality of sensors coupled to the at least one gateway device and which is stored in an object pool, wherein the object pool utilizes a distributed ledger for registering metadata associated with different portions of the operational technology data, and wherein the metadata comprises data ownership keys that associate the different portions of the operational technology data to respective entities responsible for management of the different portions of the operational technology data;
converting the representation of the data valuations for the given data set into a value for presentation to two or more data marketplace environments, wherein the two or more data marketplace environments each enable one or more data consumers to obtain data;
registering the given data set with the two or more data marketplace environments, wherein registering the given data set with a given one of the two or more data marketplace environments comprises:
accessing an extensible data marketplace interface comprising an application programming interface operatively coupled to two or more plugin modules respectively corresponding to the two or more data marketplace environments, wherein the application programming interface is configured to abstract two or more disparate protocols for which the two or more plugin modules are respectively configured to enable connection to and interaction with the two or more data marketplace environments by converting a given data format of the extensible data marketplace interface to two or more data formats respectively associated with the two or more disparate protocols and by converting the two or more data formats respectively associated with the two or more disparate protocols to the given data format of the extensible data marketplace interface;
determining relevance of the given data set for the given one of the two or more data marketplace environments based at least in part on passing at least a given portion of the metadata associated with the given data set stored in the distributed ledger to the application programming interface of the extensible data marketplace interface, the given portion of the metadata comprising types of sensor readings contained in the given data set, times at which the sensor readings contained in the given data set were captured, and locations at which the sensor readings contained in the given data set were captured;
receiving, via a polling mechanism of the application programming interface of the extensible data marketplace interface, an indication of whether the given data marketplace environment has interest in the given data set;
responsive to receiving an indication that the given data marketplace environment has interest in the given data set, determining, utilizing the data ownership keys, one or more owners of the given data set; and
passing, via the application programming interface of the extensible data marketplace interface, information about the one or more owners of the given data set, the information about the one or more owners comprising respective cryptocurrency wallet configurations;
generating one or more smart contract transactions for brokering a transfer of the given data set through at least one of the data marketplace environments to at least one data consumer utilizing the information about the one or more owners of the given data set; and
managing, via the generated one or more smart contract transactions, the transfer of the given data set to the at least one data consumer and receipt of a result of the transfer from the at least one data consumer;
wherein the steps are performed by at least one processing device comprising a processor and a memory.

2. The method of claim 1, wherein the converting step further comprises converting the representation of the one or more data valuations for the given data set into a value representing what a data owner of the given data set will accept from a data consumer in exchange for the given data set.

3. The method of claim 1, wherein the brokering step further comprises utilizing the application programming interface to abstract interactions associated with the one or more data marketplace protocols.

4. The method of claim 1, wherein the brokering step further comprises transmitting the metadata associated with the given data set to the two or more data marketplace environments to determine interest for the given data set with respect to the one or more data consumers.

5. The method of claim 4, wherein the metadata comprises identifying information about data in the given data set.

6. The method of claim 4, wherein the generating step further comprises transmitting the value computed in the converting step and additional metadata to the data marketplace protocol corresponding to an interested data consumer.

7. The method of claim 1, wherein the given data set is registered with a given one of the two or more data marketplace environments through a corresponding one of the two or more plugin modules associated with the given data marketplace environment.

8. The method of claim 1, wherein the managing step further comprises receiving cryptocurrency from the at least one data consumer as a result of the generated one or more smart contract transactions.

9. The method of claim 1, wherein the managing step further comprises receiving a receipt from the at least one data consumer as a result of the generated one or more smart contract transactions.

10. The method of claim 1, wherein the managing step further comprises maintaining one or more ledgers for recording one or more transactions associated with the result of the transfer.

11. The method of claim 1, wherein the managing step further comprises maintaining one or more wallets for receiving the result of the transfer.

12. An article of manufacture comprising a non-transitory processor-readable storage medium having encoded therein executable code of one or more software programs, wherein the one or more software programs when executed by at least one processing device implement steps of:
obtaining a representation of a plurality of data valuations for a given data set, the representation of the data valuations for the given data set comprising a value data structure including a plurality of dimensions, wherein each dimension of the value data structure corresponds to a data valuation computed by a given data valuation algorithm, wherein the given data set comprises operational technology data collected by at least one gateway device from a plurality of sensors coupled to the at least one gateway device and which is stored in an object pool, wherein the object pool utilizes a distributed ledger for registering metadata associated with different portions of the operational technology data, and wherein the metadata comprises data ownership keys that associate the different portions of the operational technology data to respective entities responsible for management of the different portions of the operational technology data;

converting the representation of the data valuations for the given data set into a value for presentation to two or more data marketplace environments, wherein the two or more data marketplace environments each enable one or more data consumers to obtain data;

registering the given data set with the two or more data marketplace environments, wherein registering the given data set with a given one of the two or more data marketplace environments comprises:

accessing an extensible data marketplace interface comprising an application programming interface operatively coupled to two or more plugin modules respectively corresponding to the two or more data marketplace environments, wherein the application programming interface is configured to abstract two or more disparate protocols for which the two or more plugin modules are respectively configured to enable connection to and interaction with the two or more data marketplace environments by converting a given data format of the extensible data marketplace interface to two or more data formats respectively associated with the two or more disparate protocols and by converting the two or more data formats respectively associated with the two or more disparate protocols to the given data format of the extensible data marketplace interface;

determining relevance of the given data set for the given one of the two or more data marketplace environments based at least in part on passing at least a given portion of the metadata associated with the given data set stored in the distributed ledger to the application programming interface of the extensible data marketplace interface, the given portion of the metadata comprising types of sensor readings contained in the given data set, times at which the sensor readings contained in the given data set were captured, and locations at which the sensor readings contained in the given data set were captured;

receiving, via a polling mechanism of the application programming interface of the extensible data marketplace interface, an indication of whether the given data marketplace environment has interest in the given data set;

responsive to receiving an indication that the given data marketplace environment has interest in the given data set, determining, utilizing the data ownership keys, one or more owners of the given data set; and passing, via the application programming interface of the extensible data marketplace interface, information about the one or more owners of the given data set, the information about the one or more owners comprising respective cryptocurrency wallet configurations;

generating one or more smart contract transactions for brokering a transfer of the given data set through at least one of the data marketplace environments to at least one data consumer utilizing the information about the one or more owners of the given data set; and managing, via the generated one or more smart contract transactions, the transfer of the given data set to the at least one data consumer and receipt of a result of the transfer from the at least one data consumer.

13. The article of claim 12, wherein the converting step further comprises converting the representation of the one or more data valuations for the given data set into a value representing what a data owner of the given data set will accept from a data consumer in exchange for the given data set.

14. An apparatus comprising:

at least one processor operatively coupled to at least one memory configured to:

obtain a representation of a plurality of data valuations for a given data set, the representation of the data valuations for the given data set comprising a value data structure including a plurality of dimensions, wherein each dimension of the value data structure corresponds to a data valuation computed by a given data valuation algorithm, wherein the given data set comprises operational technology data collected by at least one gateway device from a plurality of sensors coupled to the at least one gateway device and which is stored in an object pool, wherein the object pool utilizes a distributed ledger for registering metadata associated with different portions of the operational technology data, and wherein the metadata comprises data ownership keys that associate the different portions of the operational technology data to respective entities responsible for management of the different portions of the operational technology data;

convert the representation of the data valuations for the given data set into a value for presentation to two or more data marketplace environments, wherein the two or more data marketplace environments each enable one or more data consumers to obtain data;

register the given data set with the two or more data marketplace environments, wherein registering the given data set with a given one of the two or more data marketplace environments comprises:

accessing an extensible data marketplace interface comprising an application programming interface operatively coupled to two or more plugin modules respectively corresponding to the two or more data marketplace environments, wherein the application programming interface is configured to abstract two or more disparate protocols for which the two or more plugin modules are respectively configured to enable connection to and interaction with the two or more data marketplace environments by converting a given data format of the extensible data marketplace interface to two or more data formats respectively associated with the two or more disparate protocols and by converting the two or more data formats respectively associated with the two or more disparate protocols to the given data format of the extensible data marketplace interface;

determining relevance of the given data set for the given one of the two or more data marketplace environments based at least in part on passing at least a given portion of the metadata associated with the given data set stored in the distributed ledger to the application programming interface of the extensible data marketplace interface, the given portion of the metadata comprising types of sensor readings contained in the given data set, times at which the sensor readings contained in the given data set were captured, and locations at which the sensor readings contained in the given data set were captured;

receiving, via a polling mechanism of the application programming interface of the extensible data marketplace interface, an indication of whether the given data marketplace environment has interest in the given data set;

responsive to receiving an indication that the given data marketplace environment has interest in the given data set, determining, utilizing the data ownership keys, one or more owners of the given data set; and passing, via the application programming interface of the extensible data marketplace interface, information about the one or more owners of the given data set, the information about the one or more owners comprising respective cryptocurrency wallet configurations;

generate one or more smart contract transactions for brokering a transfer of the given data set through at least one of the data marketplace environments to at least one data consumer utilizing the information about the one or more owners of the given data set; and manage, via the generated one or more smart contract transactions, the transfer of the given data set to the at least one data consumer and receipt of a result of the transfer from the at least one data consumer.

15. The apparatus of claim 14, wherein the converting step further comprises converting the representation of the one or more data valuations for the given data set into a value representing what a data owner of the given data set will accept from a data consumer in exchange for the given data set.

16. The method of claim 1 wherein the generating step further comprises:

transmitting the metadata associated with the given data set to the data marketplace environment to determine interest for the given data set with respect to the one or more data consumers; and at least one of:
identifying information about data in the given data set; or
transmitting the value computed in the converting step and additional metadata to the data marketplace protocol corresponding to an interested data consumer.

17. The method of claim 1, wherein managing the transfer of the given data set to the at least one data consumer and the receipt of the result of the transfer from the at least one data consumer comprises recording, in at least one ledger of distributed ledger system, information characterizing the transfer of the given data set to the at least one data consumer.

18. The method of claim 17, wherein the at least one ledger of the distributed ledger system comprises a payment ledger and a donation ledger, and wherein recording the information characterizing the transfer of the given data set to the at least one data consumer comprises:

determining whether the transfer of the given data set to the at least one data consumer comprises a donation;

responsive to determining that the transfer of the given data set to the at least one consumer comprises a donation, recording in the donation ledger a pointer to a receipt generated by a data donation entity; and responsive to determining that the transfer of the given data set to the at least one consumer does not comprise a donation, recording in the payment ledger a movement of cryptocurrency from a first cryptocurrency wallet associated with the at least one data consumer to a second cryptocurrency wallet associated with an owner of the given data set.

19. The method of claim 1, wherein the plurality of dimensions of the value data structure comprise respective different valuation metrics, the different valuation metrics comprising two or more of a cost value indicator metric, a market value indicator metric, an unstructured tokenized value indicator metric and a streaming data value indicator metric.

20. The method of claim 1, wherein registering the given data set with the given data marketplace environment further comprises receiving, via the application programming interface of the given data marketplace environment, a price for the given data set on the given data marketplace platform.

* * * * *